Dec. 15, 1953 T. C. MATSON ET AL Re. 23,754

PORTABLE BED LAMP WITH ADJUSTABLE SHUTTER

Original Filed Feb. 18, 1949

INVENTORS.
THEODORE C. MATSON,
ROGER N. RIEWERTS,
DALE E. MORTENSEN,
BY H. A. Dreckman
ATTORNEY.

Reissued Dec. 15, 1953 Re. 23,754

UNITED STATES PATENT OFFICE 23,754

PORTABLE BED LAMP WITH ADJUSTABLE SHUTTER

Theodore C. Matson, Long Beach, and Roger N. Riewerts and Dale E. Mortensen, Bellflower, Calif.; said Riewerts and Mortensen assignors to said Matson Original No. 2,612,599, dated September 30, 1952, Serial No. 77,126, February 18, 1949. Application for reissue February 19, 1953, Serial No. 337,900

6 Claims. (Cl. 240—11.2)

Matter enclosed in heavy brackets [ ] appears in the original patent but forms no part of this reissue specification; matter printed in italics indicates the additions made by reissue.

This invention relates to a portable bed lamp, although it may be also used as a desk lamp, and the lamp is provided with a rotatable shutter so that the light can be deflected in the direction desired.

An object of our invention is to provide a novel portable lamp with adjustable shutter, which is formed of a plurality of stampings and is, therefore, simple in construction and inexpensive to manufacture.

A feature of our invention is to provide a novel portable lamp with adjustable shutter, in which the various parts serve more than one function when assembled, thus providing a lamp which is easy to assemble and also which requires a minimum number of parts.

Other objects, advantages and features of invention may appear from the accompanying drawing, the subjoined detailed description and the appended claims.

Figure 1:
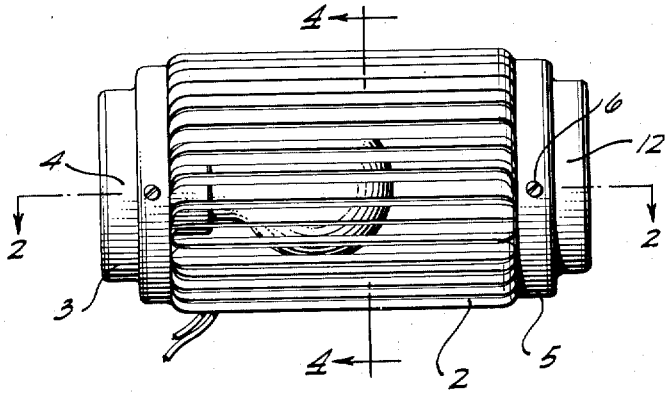
Figure 1 is a top plan view of our portable lamp.

Referring more particularly to the drawing, our portable lamp consists of a case 1, formed of a single sheet of metal, and before the case is bent it is cut by means of a die to form the louvers 2. The strip of material is then bent to form a substantial rectangular box-like structure, which is open at both ends and the louvered part of which is semi-cylindrical. The one end of the case is closed by the cap 3, the cap being attached to the case by means of screws 4 or the like. The other end of the case is closed by a ring 5, this ring also being attached to the case by means of screws 6. The ring 5 is formed with an enlarged central hole therein, indicated at 7, the purpose of which will be further described.

A transverse wall 8 is fixedly mounted within the case 1 and is positioned adjacent the cap 3. The wall 8 is provided with a cylindrical recessed bearing 9, the purpose of which will be further described.

Figure 2:
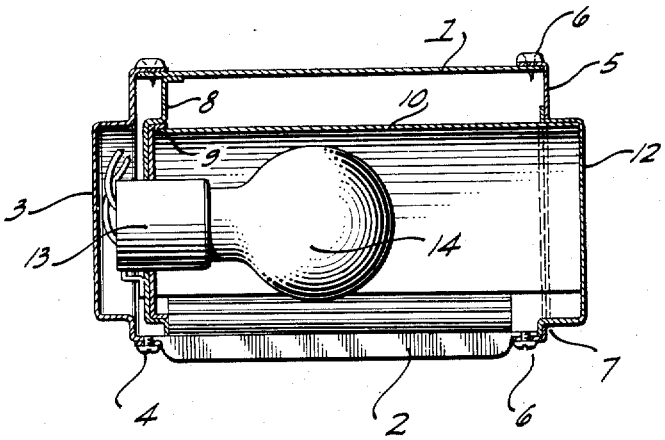
Figure 2 is a sectional view taken on line 2—2 of Figure 1.
Figure 3:
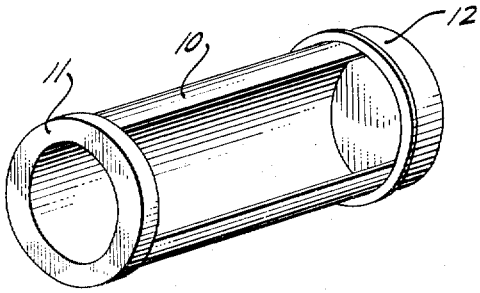
Figure 3 is a perspective view of the shutter.
Figure 4:
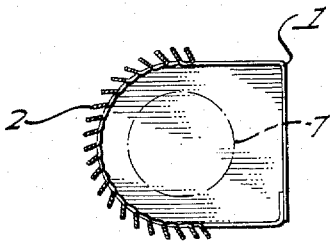
Figure 4 is a transverse sectional view of the louvered case alone.

A semi-cylindrical shutter 10 is mounted in the case 1, the end 11 of the shutter being journaled in the bearing 9. The opposite end of the shutter is closed by a cupped end 12 and this cupped end protrudes through the opening 7, so that it may be grasped to rotate the shutter 10, as desired by the user. A socket 13 is fixedly mounted in the wall 8, and the light bulb 14, which is mounted in the socket 13, extends into the shutter 10, substantially as shown in Figure 2.

It will be evident from the foregoing description that the case 1 can be assembled from a strip of metal and bent into the semi-rectangular form, the cap 3 and the ring 5 are both stamped from metal strips and are attached to the case by means of screws. Before the cap and the ring are attached, the transverse wall 8 is mounted in the case by welding or soldering this wall in position. The shutter 10 is then inserted into this bearing in the wall 8. The ring 5 is then slipped over the cupped end 12 and, thereafter, the ring 5 and the cap 3 are attached to each end of the case by means of the screws 4 and 6.

*While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.*

Having described our invention, we claim:

1. A portable bed lamp comprising a case formed of an integral strip of metal, the rear portion of the case being substantially rectangular in cross-section and the front portion of the case being semi-cylindrical, louvers extending longitudinally of the case and formed in the semi-cylindrical part of the case, a cap closing one end of said case, screws extending through the cap and into the case to secure the cap thereto, a ring partly closing the other end of said case, screws extending through the ring and into the case to removably hold the ring in position, a fixed transverse wall in said case positioned at one end of the case and adjacent said cap, said wall having a recessed bearing formed therein, a semi-cylindrical shutter within the case and movable over the louvers, one end of said shutter being journalled in said bearing, a cupped end closing the other end of said shutter and fixedly attached thereto, said cupped end extending through said ring and journalled therein, a lamp socket fixedly mounted in the transverse wall and projecting into one end of said shutter.

*2. A portable lamp comprising a case formed of an integral strip of metal, the rear portion of the case being substantially rectangular in cross-section and the front portion of the case being semi-cylindrical, louvers extending longitudinally of the case and formed in the semi-*

*cylindrical part of the case, a cap closing one end of said case and secured thereto, a ring partly closing the other end of said case and removably secured thereto, a fixed transverse member in said case positioned at one end of the case and adjacent said cap, said member having a recessed bearing formed therein, a semi-cylindrical shutter within the case and movable over the louvers, one end of said shutter being journalled in said bearing, a cupped end closing the other end of said shutter and fixedly attached thereto, said cupped end extending through said ring and journalled therein, a lamp socket fixedly mounted in the case at the cap end region and projecting into one end of said shutter.*

*3. A portable lamp comprising a case formed of an integral strip of metal, the rear portion of the case being substantially rectangular in cross-section and the front portion of the case being semi-cylindrical, louvers extending longitudinally of the case and formed in the semi-cylindrical part of the case, a cap closing one end of said case and secured thereto, a ring partly closing the other end of said case and removably secured thereto, a bearing at the cap end region of said case, a semi-cylindrical shutter within the case and movable over the louvers, said shutter being substantially open at the end adjacent the cap region, an annular member fixed to the open end of said shutter rotatably supported by said bearing, a cupped end member closing the other end of said shutter and fixedly attached thereto, the end portion of said shutter adjacent the cupped end member extending through said ring and rotatably supported thereby, a lamp socket fixedly mounted in said case at the cap end region and axially projecting into said shutter through the open end thereof.*

*4. A portable lamp comprising a case formed of an integral strip of metal, the rear portion of the case being substantially rectangular in cross-section and the front portion of the case being semi-cylindrical, louvers extending longitudinally of the case and formed in the semi-cylindrical part of the case, a cap closing one end of said case and secured thereto, a ring partly closing the other end of said case and removably secured thereto, a bearing at the cap end region of said case adapted to rotatably support an annular end member on a shutter, a semi-cylindrical shutter within the case and movable over the louvers, said shutter being substantially open at the end adjacent the cap region, an annular member fixed to the open end of said shutter rotatably supported by said bearing, a cupped end closing the other end of said shutter and fixedly attached thereto, said cupped end including an annular element, said cupped end extending outside said ring and the annular element being rotatably supported by said ring, the annular member and the annular element having outside diameters greater than the diameter of the shutter and thereby maintaining the shutter free from contact with the interior surface of said case, a lamp socket fixedly mounted in said case at the cap end region and axially projecting into said shutter through the open end thereof.*

*5. A portable lamp comprising a case formed of an integral strip of metal, the rear portion of the case being substantially rectangular in cross-section and the front portion of the case being semi-cylindrical, louvers extending longitudinally of the case and formed in the semi-cylindrical part of the case, a cap closing one end of said case and secured thereto, a ring partly closing the other end of said case and secured thereto, an axially recessed bearing at the cap end region of the case, said ring providing a bearing surface at the other end of the case, a semi-cylindrical shutter within the case and movable over the louvers, said shutter being substantially open at the end adjacent the cap region, the open end of said shutter being journalled in said axially recessed bearing and the other end of said shutter being rotatably supported by the bearing surface of the ring, a cupped end member at the latter end of said shutter and including an annular portion extending axially outward from said ring a sufficient distance to be manually grasped for rotating said shutter, a lamp socket fixedly mounted in said case at the cap end region and axially projecting into said shutter through the open end thereof.*

*6. A portable lamp comprising, a case formed of an integral strip of material and having a semi-cylindrical front portion, louvers extending longitudinally of the case and formed in the front portion of the case, a cap closing one end of said case and secured thereto, a ring partly closing the other end of said case and secured thereto, an axially recessed bearing at the cap end region of the case, said ring providing a bearing at the other end of the case, a semi-cylindrical shutter within the case and movable over the louvers, said shutter having an outside diameter less than any inside cross section of the case and being spaced from the inner walls of the case, said shutter being substantially open at the end adjacent the cap region, the open end of said shutter being journalled in said axially recessed bearing and the other end of said shutter being rotatably supported by the bearing surface of the ring, a capped end member at the latter end of said shutter and including an annular portion extending axially outward from said ring a sufficient distance to be manually grasped for rotating said shutter, a lamp socket fixedly mounted in said case at the cap end region and axially projecting into said shutter through the open end thereof.*

THEODORE C. MATSON.
ROGER N. RIEWERTS.
DALE E. MORTENSEN.

References Cited in the file of this patent or the original patent

UNITED STATES PATENTS

| Number | Name | Date |
|---|---|---|
| 548,369 | Kinsman | Oct. 22, 1895 |
| 937,004 | MacKenzie | Mar. 14, 1911 |
| 1,726,907 | Lewensohn | Sept. 3, 1929 |
| 2,374,161 | Belden | Apr. 24, 1945 |
| 2,558,538 | Chambers | June 26, 1951 |

FOREIGN PATENTS

| Number | Country | Date |
|---|---|---|
| 402,876 | Great Britain | Dec. 14, 1933 |